(12) United States Patent
Graham et al.

(10) Patent No.: US 12,005,387 B2
(45) Date of Patent: Jun. 11, 2024

(54) PULSE DELIVERY CLEANING SYSTEMS AND METHODS

(71) Applicant: Donaldson Company, Inc., Minneapolis, MN (US)

(72) Inventors: Stephan A. Graham, Minneapolis, MN (US); Steven A. Johnson, Williams, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 59 days.

(21) Appl. No.: 17/440,020

(22) PCT Filed: Mar. 19, 2020

(86) PCT No.: PCT/US2020/023502
§ 371 (c)(1),
(2) Date: Sep. 16, 2021

(87) PCT Pub. No.: WO2020/191126
PCT Pub. Date: Sep. 24, 2020

(65) Prior Publication Data
US 2022/0176300 A1    Jun. 9, 2022

Related U.S. Application Data

(60) Provisional application No. 62/820,394, filed on Mar. 19, 2019.

(51) Int. Cl.
*B01D 46/00* (2022.01)
*B01D 46/04* (2006.01)
(Continued)

(52) U.S. Cl.
CPC ............. *B01D 46/71* (2022.01); *B01D 46/04* (2013.01); *B01D 46/46* (2013.01)

(58) Field of Classification Search
CPC ......... B01D 46/04; B01D 46/46; B01D 46/71
(Continued)

(56) References Cited

U.S. PATENT DOCUMENTS

| 4,600,415 A | 7/1986 | Barton |
| 4,655,799 A | 4/1987 | Bosworth et al. |

(Continued)

FOREIGN PATENT DOCUMENTS

| CN | 101501398 | 8/2009 |
| CN | 102847386 | 1/2013 |

(Continued)

OTHER PUBLICATIONS

Brochure, "Medium-Pressure Controlled-Cleaning MCF Dust Filters", 2004, MAC Equipment, Inc. Kansas City, Missouri, 8 pages.
(Continued)

*Primary Examiner* — T. Bennett McKenzie
(74) *Attorney, Agent, or Firm* — Mueting Raasch Group (57) ABSTRACT

A filter system includes a tube sheet defining a plurality of holes in fluid communication with a plurality of filter bags. The system also includes a rotating assembly having an arm defining one or more outlets to provide pressurized air from an air source toward the tube sheet in response to pulsing one or more actuators. A motor is operably coupled to the stationary assembly and the rotating assembly to rotate the arm about an axis at a preset rotational speed. A controller is operably coupled to the motor and the one or more actuators to provide pulse commands based on a pulse interval and a jog interval. The pulse interval and the jog interval may be determined based on a measured rotational speed of the arm, which may be redetermined during operation.

20 Claims, 6 Drawing Sheets

(51) Int. Cl.
  *B01D 46/46* (2006.01)
  *B01D 46/71* (2022.01)

(58) Field of Classification Search
  USPC .......................................... 95/1; 55/282–305
  See application file for complete search history.

(56) References Cited

U.S. PATENT DOCUMENTS

| | | | |
|---|---|---|---|
| 5,116,395 A | 5/1992 | Williams | |
| 5,421,845 A * | 6/1995 | Gregg | B01D 46/04 55/294 |
| 6,605,139 B2 | 8/2003 | Felix | |
| 7,494,521 B2 | 2/2009 | Althouse et al. | |
| 8,029,583 B2 | 10/2011 | Ferguson et al. | |
| 9,186,611 B2 | 11/2015 | Boatwright, Jr. | |
| 9,782,711 B2 | 10/2017 | Barker | |
| 2007/0039290 A1* | 2/2007 | Lee | B01D 46/02 55/302 |
| 2008/0209807 A1 | 9/2008 | Tsangaris et al. | |
| 2009/0151572 A1* | 6/2009 | Ferguson | B01D 46/0087 96/427 |

FOREIGN PATENT DOCUMENTS

| | | |
|---|---|---|
| CN | 205925256 U | 2/2017 |
| EP | 0525417 | 2/1993 |
| EP | 0525417 A1 * | 2/1993 |
| EP | 1628737 | 3/2006 |
| FR | 2997867 | 5/2014 |
| JP | S49-10027 B | 3/1974 |
| JP | H2-112315 U | 9/1990 |
| WO | 2004/103527 | 12/2004 |

OTHER PUBLICATIONS

International Patent Application No. PCT/US2020/023502 filed Mar. 19, 2020; PCT International Preliminary Report on Patentability dated Sep. 16, 2021; 8 pages.

International Patent Application No. PCT/US2020/023502 filed Mar. 19, 2020; PCT International Search Report and Written Opinion dated Jun. 23, 2020; 13 pages.

Screen captures from YouTube clip entitled "Medium Pressure Baghouse—New Features", uploaded on Oct. 25, 2018 by user "Imperial Systems, Inc." Retrieved from the internet: https://www.youtube.com/watch?v=Lnt7qZP-pHo; 2 pages.

* cited by examiner

PULSE DELIVERY CLEANING SYSTEMS AND METHODS

This application is the § 371 U.S. National Stage of International Application No. PCT/US2020/023502, filed 19 Mar. 2020, which claims the benefit of U.S. Provisional Application No. 62/820,394, filed 19 Mar. 2019, the disclosures of which are incorporated by reference herein in their entireties.

The present technology is generally related to filter systems and, in particular, to the control of pulse delivery cleaning systems for bag house filters.

Dust collectors are used to clean particulate matter from airflow streams. One embodiment of dust collectors includes bag house filters. Bag house filters include: a housing, a dirty air inlet, a clean air outlet, and a tube sheet having a plurality of apertures. The tube sheet separates the housing between a dirty air side and a clean air side and holds filter bags. The bags, or filter bags, are made of a filter media so that as dirty air flows from the dirty air side to the clean air side, the air must flow through the bags and the filter media of the bags prevents particulate matter from reaching the clean air side. Periodically, the particular laden bags are pulse cleaned to achieve continuous duty operation of filtering.

SUMMARY

This disclosure generally relates to pulse delivery cleaning systems and methods for bag house filters that may require less maintenance and need fewer adjustments, as well as facilitating ease of manufacturing.

In one aspect, the present disclosure provides a system including a stationary assembly having a tube sheet defining a plurality of holes in fluid communication with a plurality of filter bags and further having one or more actuators each configured to release pressurized air in response to a pulse command. The system also includes a rotating assembly having an arm defining one or more outlets positioned along a length of the arm. The one or more outlets are configured to provide pressurized air from an air source toward the tube sheet in response to the one or more actuators receiving a pulse command. The system also includes a motor operably coupled to the stationary assembly and the rotating assembly configured to rotate the arm about an axis at a preset rotational speed. The system also includes a controller operably coupled to the motor and the one or more actuators. The controller includes a processor configured to: provide a set of pulse commands to the one or more actuators to provide a set of pulses over one or more revolutions of the arm, determine a jog interval between the set of pulse commands and a subsequent set of pulse commands based on a measured rotational speed of the arm, and provide, after waiting one jog interval, the subsequent set of pulse commands to the one or more actuators to provide a subsequent set of pulses over one or more subsequent revolutions of the arm.

In another aspect, the present disclosure provides an apparatus including an input interface, an output interface, a memory, and a processor operably coupled to the input interface, the output interface, and the memory. The processor is configured to determine a rotational speed of an arm based on measurements from a position sensor assembly using the input interface. The arm defining one or more outlets are configured to release pressurized air in response to one or more actuators receiving a pulse command. The processor is also configured to determine a pulse interval and a jog interval based on the rotational speed of the arm. The pulse interval defines an interval between pulse commands in one set of pulse commands. The jog interval defines an interval between a set of pulse commands and a subsequent set of pulse commands. The processor is also configured to store the pulse interval and the jog interval into the memory. The processor is also configured to provide the subsequent set of pulse commands based on the pulse interval and the jog interval to the one or more actuators using the output interface to release the subsequent set of pulses of pressurized air through the one or more outlets.

In another aspect, the present disclosure provides a method including revolving an arm about an axis. The arm defining one or more outlets positioned along a length of the arm. The one or more outlets are configured to direct pressurized air from an air source toward a tube sheet. The tube sheet defines a plurality of holes in fluid communication with a plurality of filter bags. The method also includes releasing a set of pulses of pressurized air from the one or more outlets over one or more revolutions of the arm. The method also includes determining a jog interval between the set of pulses and a subsequent set of pulses of pressurized air based on a measured rotational speed of the arm. The method also includes releasing, after waiting one jog interval, the subsequent set pulses from the one or more outlets over one or more subsequent revolutions of the arm.

DETAILED DESCRIPTION

The present disclosure relates to filter systems and, in particular, control of pulse delivery cleaning systems for filters. Existing pulse delivery cleaning systems for dust collectors, such as round bag house systems, use motors and gearboxes to rotate an arm for pulse delivery cleaning, which may be susceptible to mechanical slip, mechanical failures, or other conditions that affect the position or rotational speed of the arm over long periods of time. As little as one-percent slip from the preset rotational speed can cause a complete miss of a set of filter bags in one rotation of the arm, or at least inefficient release of pulses over some filter bags. The pulse cleaning delivery system may require adjustment, or even repair, to return to desirable performance. Complex motors or gearboxes may be used to facilitate accurate and precise rotation of the arm to deliver pulses to the filter bags, which may affect the manufacturability of these systems and may result in higher high failure rates.

The techniques of this disclosure provide a control system and method for pulse delivery cleaning based on actual rotation of the arm to maintain accurate pulse delivery to clean the filter bags. In other words, these techniques provide for adjustments in pulse delivery cleaning in response to one or more measurements related to the arm. The control system measures an actual rotational speed of the arm using a position sensor, such as a proximity sensor. A pulse interval is calculated to deliver pulses when the arm is aligned over a set of filter bags based on the measured rotational speed of the arm so that pulses can be consistently delivered to the "dead center" of the openings of the filter bags over long periods of time. In some embodiments, a jog interval is determined that may be used in place of one, or in between some, of the pulse intervals, which shifts a set of subsequent delivered pulses and may facilitate complete, even cleaning of the filter bags. The pulse interval and the jog interval may be redetermined during operation based on further measurements of the rotational speed of the arm. In general, the pulse delivery cleaning systems that have control systems or use methods described herein may be manufactured more easily and require less maintenance and down time than some existing pulse delivery cleaning systems to operate at desirable performance over long periods of time.

Reference will now be made to the drawings, which depict one or more aspects described in this disclosure. However, it will be understood that other aspects not depicted in the drawings fall within the scope of this disclosure. Like numbers used in the figures may refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

As used herein, the term "or" is generally employed in its inclusive sense, for example, to mean "and/or" unless the context clearly dictates otherwise. The term "and/or" means one or all the listed elements or a combination of at least two of the listed elements.

Various embodiments of the present disclosure relate to filter systems, such as round dust collectors or round bag house systems. Although the pulse delivery cleaning techniques described herein may be used with any suitable filter system, one example of a round bag house filter system is shown in FIG. 1 to facilitate understanding of these techniques.

Figure 1:
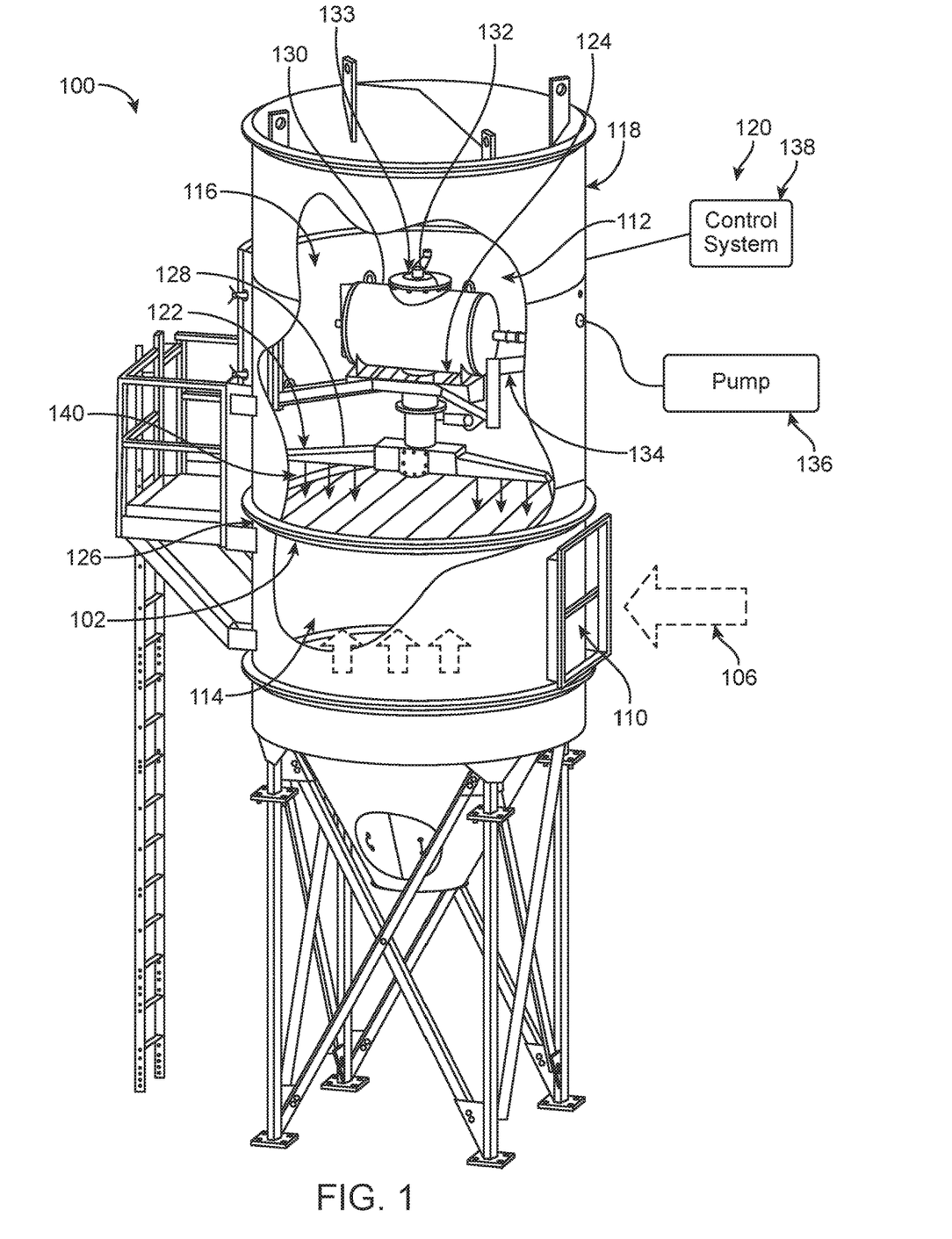
FIG. 1 is a perspective cutaway view of one example of a dust collector utilizing a pulse delivery cleaning system.
Figure 2:
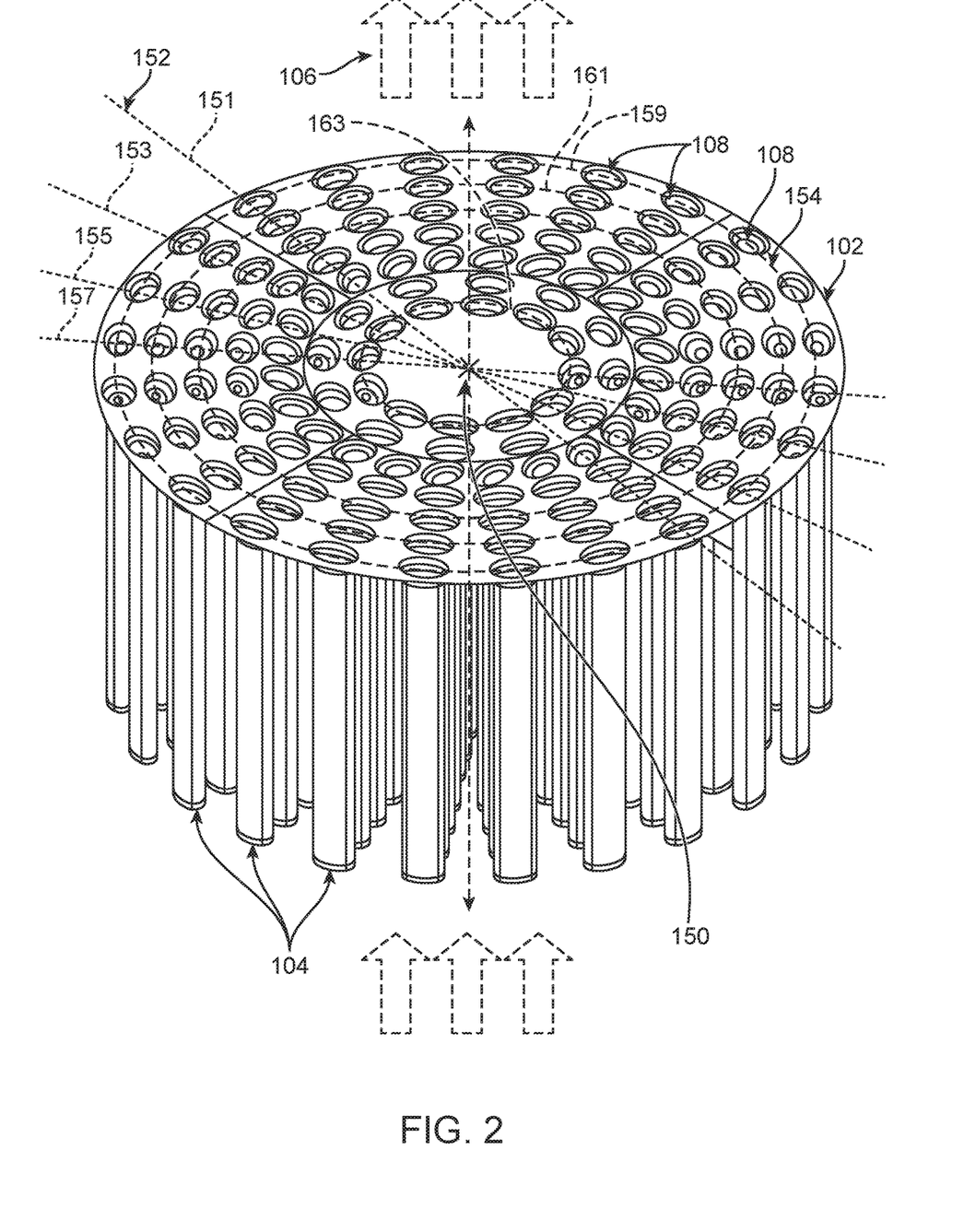
FIG. 2 is a perspective view of one example of a tube sheet that may be used in the dust collector of FIG. 1 that may be cleaned by the pulse delivery cleaning system.
Figure 3:
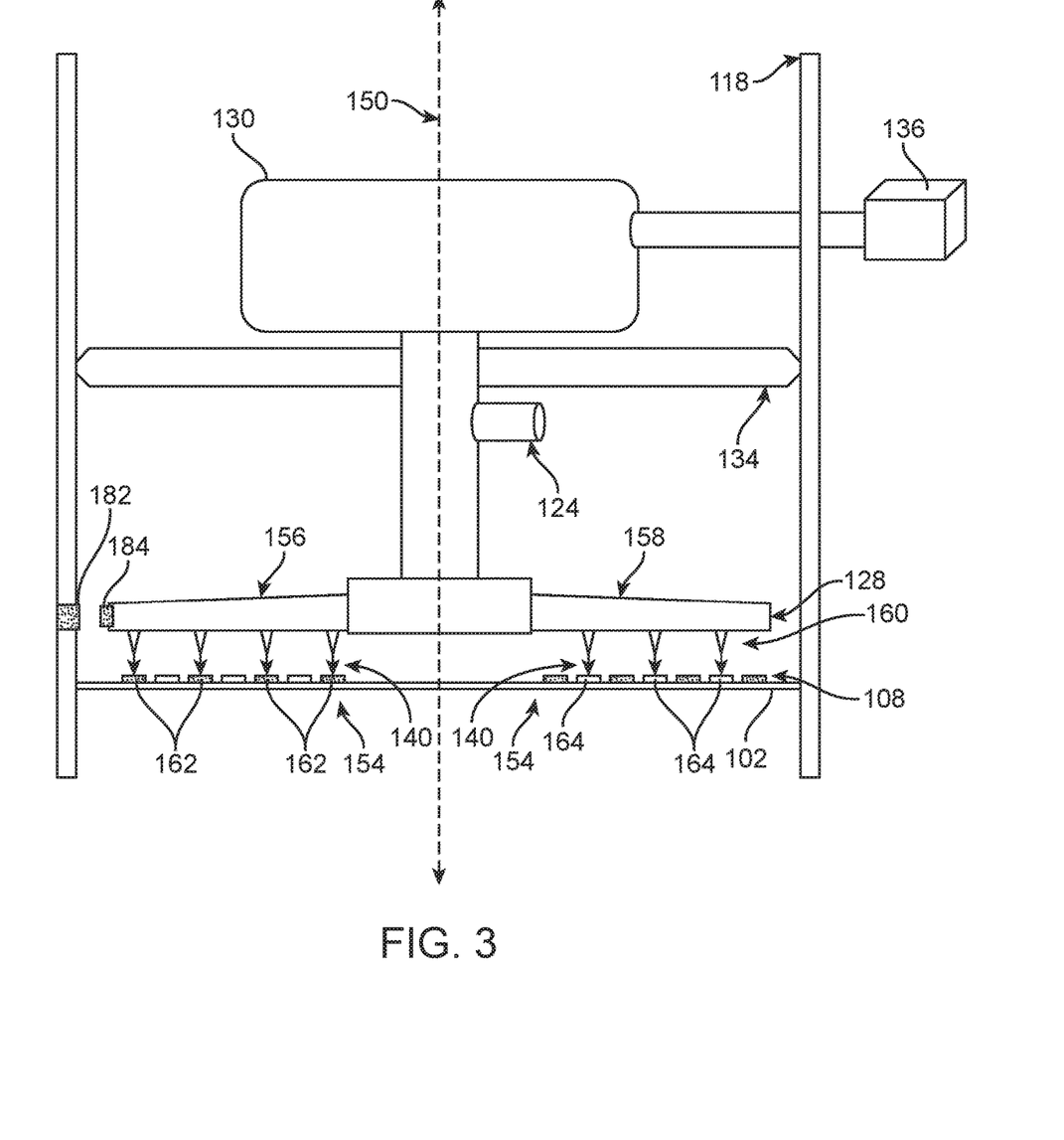
FIG. 3 is a schematic partial cross-sectional view of the dust collector of FIG. 1.
Figure 4:
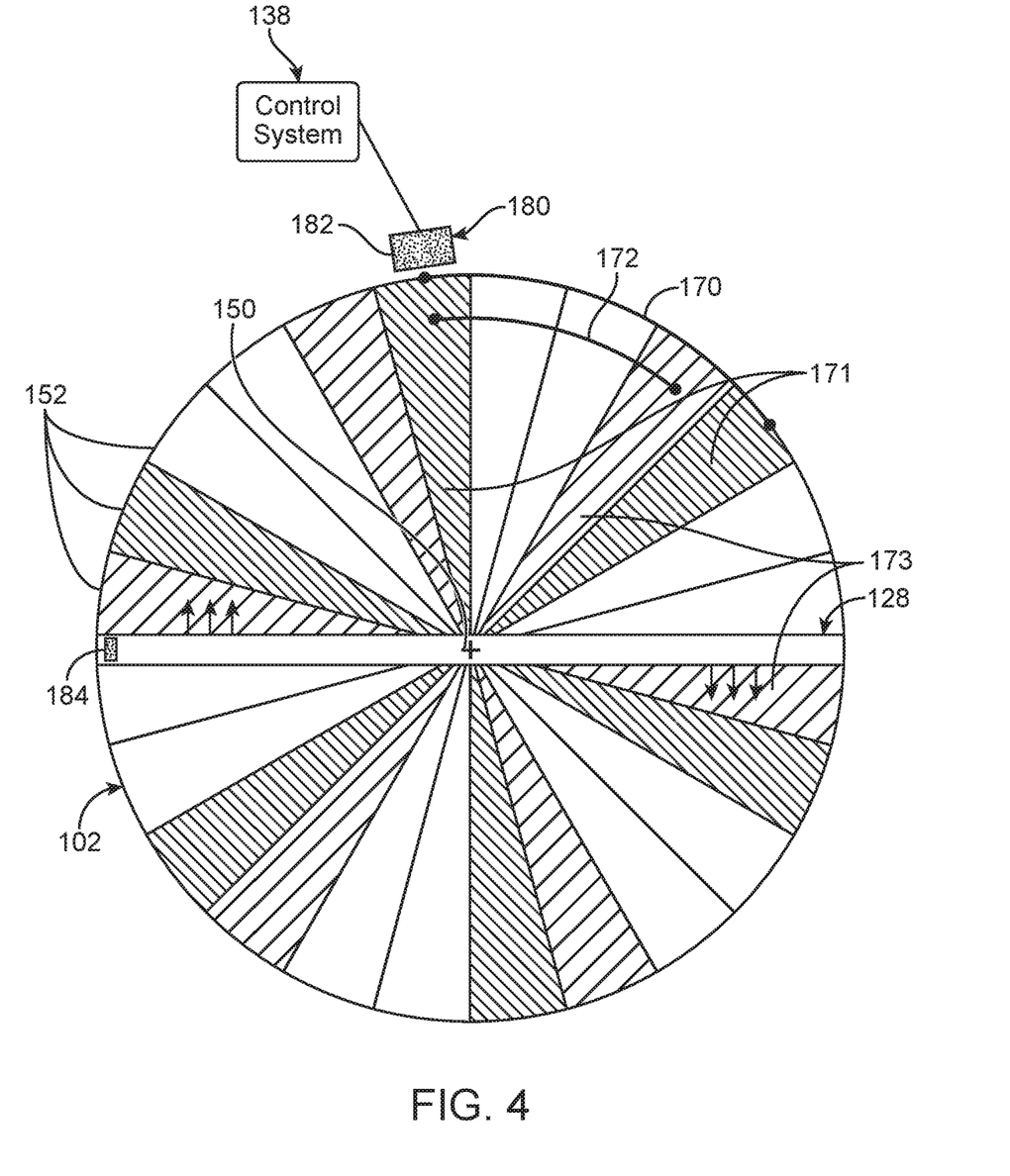
FIG. 4 is a schematic overhead view of the spokes of the tube sheet of FIG. 2.

FIGS. 1-4 show various views of one example of a filter system 100, which is a round bag house filter system. FIG. 1 shows a cutaway perspective view of the filter system 100 having a tube sheet 102 used to clean an airflow 106 by removing dust or other particulates. The tube sheet 102 has a surface that is illustrated schematically with line shading, whereas more detail is shown in FIG. 2. In FIG. 2, the tube sheet 102 is shown having a plurality of holes 108 and a plurality of filter bags 104 coupled to the tube sheet to cover the holes. The holes 108 and the filter bags 104 coupled to the holes are arranged into radial spokes 152 and concentric rings 154 along the surface of the tube sheet 102. FIG. 3 shows a schematic cross-sectional view of one or more outlets 160 of an arm 128 positioned over different rings 154 of the holes 108. FIG. 4 shows an overhead view of the tube sheet 102 and the rotation of the arm 128 in relation to the spokes 152. In the illustration, each spoke 152 is shown as a wedge, or slice, of the circle. Although, the lead lines from 152 shown in FIG. 4 point to only three of the plurality of spokes illustrated, all the wedges represent spokes 152 in this illustration.

In general, the filter system 100 filters dust from the airflow 106 that passes through the plurality of filter bags 104 and through the plurality of holes 108, or apertures, defined in the tube sheet 102 that are in fluid communication with the filter bags. The filter bags 104 may be cleaned from time-to-time using pulse cleaning to extend their working life.

As can be seen in FIG. 1, in operation, the airflow 106 including dirty air is drawn through a dirty air inlet 110 into a housing 118 by way of a blower arrangement (not shown). The airflow 106 moves into an interior volume 112 of the housing 118. The airflow 106 may start in a dirty air volume 114 of the interior volume 112 on the dirty air side of the tube sheet 102. The airflow 106 may pass downstream (the "up" direction in the illustration) through the filter bags 104 (FIG. 2) coupled to the tube sheet 102, where dust and debris are removed from the airflow. The airflow 106 including filtered air then flows into a clean air volume 116 of the interior volume 112 on a clean air side of the tube sheet 102. The tube sheet 102 and the plurality of filter bags 104 coupled to the tube sheet divide the interior volume 112 and separate the dirty air volume 114 from the clean air volume 116. The airflow 106 including the filtered air then exits a housing 118 of the filter system 100 through a clean air outlet (not shown).

The housing 118 may have a generally cylindrical structure surrounding the interior volume 112. The dirty air inlet 110 and the clean air outlet may be defined by the housing 118. The tube sheet 102 may be mechanically coupled to the housing 118 and may have a round circular structure that complements the interior shape of the housing 118 to form a seal around its perimeter with the housing.

The blower arrangement directs air from the dirty air inlet 110 to the clean air outlet. In some embodiments, the blower arrangement may create a vacuum at the clean air outlet. The blower arrangement may be located remotely from the housing 118 but connected in fluid, or airflow, communication by duct work to the clean air outlet.

The filter system 100 may also include a dust collection hopper oriented in communication with the interior volume 112 and below the housing 118. The hopper may have a frusto-conical structure. The hopper collects dust and debris separated from the air. A support structure, such as legs or other support beams oriented to support the housing 118 and hopper, may be included. Typically, the housing 118 and hopper are supported vertically above the ground such that a drum or some other container can be placed underneath the hopper to empty the hopper of dust and debris.

A ladder may be provided for accessing the interior volume 112 of the housing 118. The ladder may extend to a platform. The person servicing the filter system 100 can climb the ladder, stand on the platform, and then open a service door, which provides access to the interior volume 112. In the illustrated embodiment, the service door provides access to a clean air volume 116 of the interior volume 112.

The filter system 100 includes a pulse delivery cleaning system 120 to provide one full clean cycle of the filter bags 104 over a time period defined as a full clean time. In the illustrated embodiment, the pulse delivery cleaning system 120 includes a rotating assembly 122 that rotates about a central axis 150 (FIGS. 2-4) by a motor 124 to deliver pressurized pulses 140 of air through different holes 108 in the tube sheet 102 to the filter bags 104 for cleaning. In general, the rotating assembly 122 includes one or more components that rotate in response to running the motor 124. The pulse delivery cleaning system 120 may also include a stationary assembly 126, which includes one or more components of the filter system 100 that do not rotate in response to running the motor 124. The motor 124 may be operably coupled to either or both of, or between, the stationary assembly 126 and the rotating assembly 122.

The rotating assembly 122 may include an arm 128 that has a generally linear elongate structure extending laterally, or perpendicular, to the axis 150. The stationary assembly 126 may include the housing 118, the tube sheet 102, a compressed air tank 130, at least one actuator 132, a mounting structure 134 that is coupled to the housing 118 to support one or more components of the filter system 100 in the clean air volume 116, an air compressor pump 136, which may be located outside of the housing 118, a control system 138, or any other stationary structure of the filter system 100.

The arm 128 may be rotatably coupled to the mounting structure 134 to support the arm above the tube sheet 102 in the clean air volume 116. The motor 124 may be operably coupled to the arm 128 and the mounting structure 134 to rotate the arm about the axis 150 when in operation.

The arm 128 may include an arm housing defining a volume of an air distribution header within the arm housing. One or more outlets 160 may be positioned, or defined, along a length of the arm 128 that are in selective fluid communication with the air distribution header, the tank 130, and the pump 136. One or more diaphragm valves may be used to selectively separate the outlets 160 from one or more of the air distribution header, the tank 130, or the pump 136, which may be opened or closed using at least one actuator 132. The outlets 160 may be include apertures defined by the arm housing or nozzles extending from the arm housing. The pulse delivery cleaning system 120 may provide a jet of pressurized air from an air source, such as the tank 130 or pump 136, through the air distribution header in the arm housing, and through the outlets 160.

In one or more embodiments, each of the filter bags 104 is oriented to extend from the tube sheet 102 into the dirty air volume 114. The filter bag 104 may be removably mounted to the tube sheet 102, such that after a period of use, the filter bag 104 can be removed and replaced with a new filter bag when the working life of the filter bag has expired. The arm 128 directs a jet of pressurized air upstream (the "down" direction as illustrated) through the one or more outlets 160 into at least one of the holes 108 in the tube sheet 102 and at least one corresponding filter bag 104 to remove at least some of the dust and debris from the dirty side of the filter bag to clean the filter bag. In other words, the pulses 140 of pressurized air are directed in a direction opposite to the airflow 106 through the filter bags 104 and the holes 108. The dust and debris may fall by gravity into the hopper. In this manner, the filter system 100 may operate for a longer period of time before replacement of the filter bag 104 compared to a system without the pulse delivery cleaning system 120.

As can be seen in FIG. 2, the holes 108 and the corresponding filter bags 104 may be arranged into one or more radial spokes 152. The spokes 152 may extend along a line that intersects with the axis 150. Each spoke 152 may include one or more holes 108. Each spoke 152 may have the same or a different number of holes 108 than the other spokes. In the illustrated embodiment, the spokes 151 and 155 have ten holes each (five on each side of the axis 150), and the spokes 153 and 157 have fourteen holes each (seven on each side of the axis). The arm 128 momentarily aligns to each of the spokes 152 during each revolution.

The holes 108 and the corresponding filter bags 104 may further be arranged into concentric rings 154. Each ring 154 may have a circular shape centered at the axis 150. Each ring 154 may have the same or a different number of holes 108 than the other rings. In the illustrated embodiment, the rings 159 and 161 have twenty-four holes each, whereas the ring 163 has twelve holes. In general, rings 154 closer to the axis 150 may have a smaller diameter and fewer holes 108 than rings further from the axis near the periphery of the tube sheet 102.

Each of the outlets 160 of the arm 128 may be aligned to a different ring 154 and aligned to pass over a center of each hole 108 in the respective ring. The arm 128 may include or define one or more segments. As can be seen in FIG. 3, the arm 128 may include a first segment 156 and a second segment 158 extending opposite to the first segment. The outlets 160 on the first segment 156 may be aligned to a first subset 162 of the holes 108 arranged into concentric rings 154, and the outlets 160 on the second segment 158 may be aligned to a second subset 164 of the holes 108 arranged into concentric rings 154. For example, if the concentric rings 154 were numbered from the innermost ring to the outermost ring from one to seven, the outlets 160 of the first segment 156 would be aligned to the odd rings (1, 3, 5, 7) and the outlets 160 of the second segment 158 would be aligned to the even rings (2, 4, 6). One complete revolution of the arm 128 may be used to pass each outlet 160 over each hole 108 in each concentric ring 154.

The air tank 130 may be coupled to the mounting structure 134 and mounted inside the clean air volume 116. In other embodiments, the air tank 130 may be mounted outside of the housing 118, for example, on a roof of the housing. The air tank 130 may be operably coupled to the pump 136, which pressurizes air to store in the tank. The air tank 130 may be operably connected in fluid communication to the one or more outlets of the arm 128 to provide pressurized pulses 140 of air to the one or more outlets.

The at least one actuator 132 may be coupled to the tank 130 and at least one diaphragm. The at least one actuator 132 is configured to receive a pulse command and provide a set of pressurized pulses 140 from the arm 128, for example, by lifting a diaphragm to allow pressurized air from the tank 130 to flow through the one or more outlets along the arm 128. In one or more embodiments, one or more diaphragm valves 133 may be coupled to the tank 130 or the arm 128. Each of the diaphragm valves 133 may include one or more diaphragms positioned as a seal between two volumes. A diaphragm valve 133 may be opened using an actuator, such as a solenoid, to release pressure on one side of a diaphragm and opens the diaphragm valve. Opening of the one or more diaphragm valves 133 may fluidly connect the tank 130 and the outlets 160 of the arm 128. In the illustrated embodiment, the double-diaphragm setup uses two diaphragm valves 133 positioned on top of the tank including a small diaphragm valve, which may be opened using a solenoid to open a large diaphragm valve, which fluidly connects the tank 130 to the arm 128 allowing airflow from the tank 130 to the outlets 160 of the arm 128.

As used herein, a "set of pulses" or "set of pressurized pulses" or "set of pressurized pulses of air" refers to one pulse of pressurized air from each of the one or more outlets 160 of the arm 128. In the illustrated embodiment, one actuator 132 may be used to provide all pressurized pulses 140 from the arm 128 at a time. In other embodiments, the at least one actuator 132 is coupled to the rotating assembly 122 instead of the stationary assembly 126. In other embodiments, more than one actuator 132 and more than one diaphragm valve 133 may be used to provide the set of pressurized pulses 140 from the arm 128.

The actuator 132 may open the diaphragm for a predetermined duration to provide the set of pressurized pulses 140 from the pressurized air in the tank 130. After the actuator 132 provides the set of pressurized pulses 140, the diaphragm may be closed by the actuator for a time interval to allow the tank 130 to pressurize again. The arm 128 may continue to rotate while the diaphragm is closed to position the arm over a different set of holes 108 of the tube sheet 102. The actuator 132 may open the diaphragm at a later time after the interval, or when the time interval expires, for the same predetermined duration to provide a subsequent set of pressurized pulses to the different set of holes 108. The alternating of open and closed states of the diaphragm by the actuator 132 may be repeated periodically as the arm 128 rotates to provide a plurality of pulses to clean all the filter bags 104 in the filter system 100.

The pump 136 may be appropriately sized to pressurize the tank 130 to a desired pressure between subsequent pulses, for example, based on a desired full clean time and the number of spokes 152. In general, when the filter system 100 is larger and has more filter bags 104, the size of the tank 130 and the capacity of the pump 136 are also increased to maintain a similar full clean time for all the filter bags 104.

In some embodiments, a relief valve or pressure sensor (not shown) may be coupled to the tank 130 to determine medium pressure in the tank 130. A relief valve may help to regulate pressure in the tank 130. The filter system 100 may be designed to minimize the number of times that such a valve is opened to regulate pressure in the tank 130. In some cases, opening the relief valve may create an undesirable level of noise.

As can be seen in FIGS. 3-4, the filter system 100 may include a position sensor assembly 180 that, when activated or triggered, provides an indication of the location of the arm 128. The position sensor assembly 180 may be operably coupled to the control system 138 to provide measurements related to rotation of the arm 128. The position sensor assembly 180 may include a first part 182 and a second part 184. The first part 182 may be coupled to the stationary assembly 126 and in a fixed location, and the second part 184 may be coupled to the rotating assembly 122 and positioned to pass the first part 182 once per revolution of the arm 128. In some embodiments, the first part 182 may be coupled to the housing 118 near the rotational path of the arm 128, and the second part 184 may be coupled to an end of the arm.

Any suitable type of position sensor may be used in the position sensor assembly 180. One example of a position sensor assembly 180 may include a position sensor, such as a hall effect sensor, as the first part 182 and a sensor target, such as a magnet, as the second part 184. In general, an active or electrically-powered part of the position sensor assembly 180 may be coupled to the stationary assembly 126 and a passive or non-powered part of the assembly may be coupled to the rotating assembly 122.

In general, the arm 128 rotates in one direction about the axis 150. In the illustration, arrows are used to show the arm 128 rotating in a clockwise direction. The position sensor assembly 180 may be used to detect when the arm 128 has made one complete revolution around the axis 150.

Figure 5:
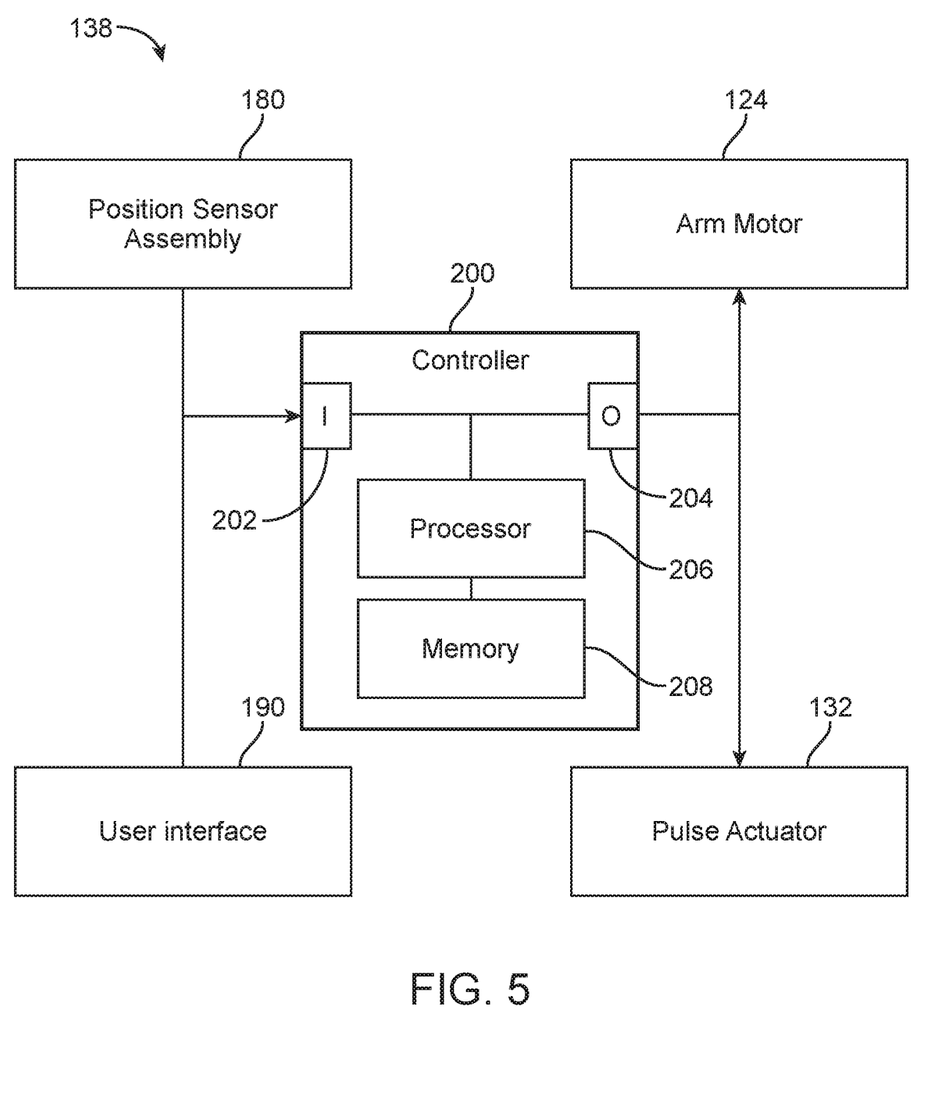
FIG. 5 is a schematic diagram of one example of a control system that may be used with the dust collector of FIG. 1.

As perhaps best seen in FIG. 5, the control system 138 may include a controller 200 operably coupled to the position sensor assembly 180, the motor 124, the one or more actuators 132, and a user interface 190. In particular, the position sensor assembly 180 and the user interface 190 may be operably coupled to an input interface 202 of the controller 200, and the motor 124 and the one or more actuators 132 may be operably coupled to the output interface 204 of the controller 200. The controller 200 may include a processor 206 and a memory 208. The processor 206 may be operably coupled to the input interface 202, the output interface 204, and the memory 208. The input interface 202 and the output interface 204 may be physically different interfaces or a single interface capable of input and output functionalities. The input interface 202 and the output interface 204 may use any suitable wired or wireless connection to operably connect the controller to the respective components.

A processor 206 of the controller 200 may receive an indication of the arm location from the input interface 202 and may determine a rotational speed of the arm based on the indication. Any suitable technique for determining the rotational speed of the arm known to one of ordinary skill in the art having the benefit of this disclosure may be used. In one or more embodiments described herein, the processor 206 may be configured to run one or more timers while the arm 128 is rotated by the motor 124. The processor 206 may start a timer when receiving a first indication from the position sensor assembly 180 that one segment of the arm 128 has passed a particular location. The processor 206 may stop the timer when receiving a second indication from the position sensor assembly 180 that the same segment of the arm 128 has passed the particular location again. The value of the timer, or the duration between the start time and the stop time of the timer, can be used to correspond to one revolution of the arm 128 and used to determine a rotational speed of the arm 128, such as a number of revolutions per minute (RPM).

The rotational speed of the arm may be stored in the memory 208. The rotational speed is used by the processor 206 to determine parameters related to pulse delivery cleaning, for example, to determine a pattern of pulses.

A predetermined pattern of pulses may be used so that the pulse delivery cleaning system 120 can clean all filter bags 104 within a desired full clean time. The predetermined pattern may correspond to rotating the arm 128 past a predetermined number of one or more radial spokes 152 between pulses. In some embodiments, the predetermined number of spokes 152 is greater than one, and a full clean cycle of the filter bags 104 corresponds to more than one revolution of the arm. For example, as can be seen with reference to FIG. 4, the predetermined pattern skips three spokes 152 between pulses. The subset 171 of spokes 152 having diagonal line shading represents the spokes that may receive a pressurized pulse 140 during a first revolution of the arm 128.

In some embodiments, the processor 206 may determine a pulse interval for pulse delivery cleaning. As used herein, the term "pulse interval" refers to a time duration between subsequent deliveries of pulses during rotation of the arm 128. The pulse interval may be determined based on a desired number of spokes passed or skipped between pulses and the rotational speed of the arm 128. For example, predetermined pattern of pulses may define a pulse interval that corresponds to rotation past four of the spokes 152, which may also be described an arc length of four spokes, or a pulse interval that skips three spokes between pulses. As can be seen in FIG. 4, for example, rotation past four spokes 152 is equal to an arc length 170. The pulse interval may be determined based on dividing the arc length 170 by the rotational speed of the arm 128.

In some embodiments, the predetermined number of radial spokes 152 passed during one pulse interval is divisible into the total number of spokes. In other words, the total number of spokes 152 may be an integer multiple of the predetermined number of radial spokes passed during one pulse interval.

After the first revolution of the arm 128, which may be detected using the position sensor assembly 180, the predetermined pattern of pulses may jog, or shift, the subsequent pulses. As can be seen in FIG. 4, the subset 173 of spokes 152 having "W"-pattern line shading may represent the spokes that may receive a pressurized pulse 140 as the arm 128 makes a second revolution. The subsequent pulses may be jogged after each revolution of the arm 128.

Using a jogging functionality with the pulse interval with may facilitate even coverage of the spokes 152. The processor 206 may also determine a jog interval for pulse delivery cleaning. As used herein, the term "jog interval" refers to a duration between successive deliveries of pulses that is different than the pulse interval, which may be used at the beginning of one or more revolutions of the arm 128. The jog interval may be determined based on a desired number of spokes shifted each revolution of the arm 128 and the rotational speed of the arm 128. For example, the predetermine pattern of pulses may define a jog interval that corresponds to rotation past three of the spokes 152, which may also be described an arc length of three spokes, or a pulse interval that skips two spokes between pulses. As can be seen in FIG. 4, for example, rotation past three spokes 152 is equal to an arc length 172. The jog interval may be determined based on dividing the arc length 172 by the rotational speed of the arm 128.

In the illustrated embodiment, the arc length 172 corresponding to the jog interval is shorter than the arc length 170 corresponding to the pulse interval. Accordingly, the corresponding jog interval may be proportionally shorter in time than the corresponding pulse interval. For example, the jog interval may be configured to provide a subsequent pulse command one spoke 152 earlier than the pulse interval. In other embodiments, the jog interval may be longer than the pulse interval. One or both of the pulse interval and the jog interval may be stored into the memory 208.

In one or more embodiments described herein, the processor 206 may be configured to provide a set of pulse commands to the one or more actuators 132 to provide a set of pulses over one or more revolutions of the arm 128. A pulse command may be a voltage excitation pulse provided from the controller 200 to the one or more actuators 132. In one example, each pulse command has a 100-millisecond duration. The processor 206 may also be configured to determine a jog interval between the set of pulse commands and a subsequent set of pulse commands based on a measured rotational speed of the arm 128. Further, the processor 206 may provide, after waiting one jog interval, the subsequent set of pulse commands to the one or more actuators 132 to provide a subsequent set of pulses over one or more subsequent revolutions of the arm 128. The pulse commands or the subsequent pulse commands may be spaced by one pulse interval.

The processor 206 may be configured to provide each of the pulse commands when at least one of the one or more outlets 160 is centered over a corresponding hole 108 of the tube sheet 102, which may ensure an effective "dead center" backflush pulse to the filter bags 104. In some embodiments, the first part 182 of the position sensor assembly 180 may be aligned to a center of one of the spokes 152, and the second part 184 of the position sensor assembly may be aligned to the outlets 160. The predetermined pattern of pulses may be initiated based on activation of the position sensor assembly 180. In other embodiments, the position sensor assembly 180 may not be aligned to one of the spokes 152, but the center of the subsequent spoke 152 may be calculated based on a known distance from the first part 182 of the position sensor assembly 180 to the center of the subsequent spoke and the measured rotational speed of the arm 128.

The processor 206 may be configured to measure the rotational speed of the arm 128 after each of a first predetermined number of one or more revolutions of the arm. In some embodiments, the rotational speed of the arm 128 is measured, or determined, after each revolution of the arm. In other words, the first predetermined number may be equal to one.

The processor 206 may also be configured to wait one jog interval after each of a second predetermined number of one or more revolutions of the arm 128. In some embodiments, the processor 206 is configured to waits one jog interval after each revolution of the arm 128. In other words, the second predetermined number may be equal to one.

The user interface 190 of the control system 138 may be configured to accept user input or to provide information to the user. Any suitable type of user interface may be used, such as a keyboard, a button, a knob, a graphical user interface and display (e.g., including touchscreen), microphone, or speaker. A user may provide user input to the controller 200 through the user interface 190. In some embodiments, the user input may indicate a tube sheet hole configuration, such as the number of spokes 152 in the tube sheet 102. In some embodiments, a pulse interval or jog interval may be determined based on user input indicating the tube sheet hole configuration and the measured rotational speed of the arm using the position sensor assembly 180. User input may also indicate the preset rotational speed of the motor, which may be used to determine an initial pulse interval or jog interval. User input may also indicate a desired full clean time, which may be used to determine the pulse interval or jog interval.

Further, the controller 200 may determine whether the measured location of the arm 128 at a given time indicates that the rotating assembly 122 requires maintenance and can provide an alarm to the user interface 190. In one example, a maintenance-type alarm may be provided to the user interface 190, which may be an audio or visual alert, when the time between activations of the position sensor assembly 180 exceeds a threshold time, which may indicate that the rotating assembly 122 is moving at only a portion of its intended speed. For example, an alarm may be provided when one rotation takes 2 minutes instead of only 1 minute, indicating the rotating assembly 122 is moving at half of its intended speed.

In one or more embodiments, a proximity sensor is used in the position sensor assembly 180 to measure the arm location for calculating the rotational speed. With this information, pulse logic can be programmed into a programmable logic controller (PLC) used in the control system 138 and pulse commands can be sent to a solenoid as the actuator 132 to control pulse timing to fire the diaphragm valve, such that a pulse of backflushed air is directed at the center of each hole 108 in one spoke 152 of the tube sheet 102. In addition, sequence adjustments can be programmed to provide a predetermined pattern of pulses having a jog pattern every predetermined number of pulses to facilitate coverage of all holes 108 in the tube sheet 102 within a full clean time. Without jogging, a repeating or periodic pulse pattern can develop that leaves some spokes 152 of the tube sheet 102 un-pulsed or unevenly pulsed within a full clean time. Sequence adjustments made to change the pulse interval time may directly influence the pressure in the tank 130 achieved during the refilling operation between pulses, for example, to facilitate adjusting tank pressurization while still pulsing on the "dead center" of the tube sheet holes 108. Lastly, by using the position sensor assembly 180 to calibrate and adjust the pulse interval time during operation, no "fine tuning" may be needed during installation of the filter system 100.

One or more of the components, such as controllers, processors, or sensors, described herein may include a processor, such as a central processing unit (CPU), computer, logic array, or other device capable of directing data coming into or out of the controller. The controller may include one or more computing devices having memory, processing, and communication hardware. The controller may include circuitry used to couple various components of the controller together or with other components operably coupled to the controller. The functions of the controller may be performed by hardware and/or as computer instructions on a non-transient computer readable storage medium.

The processor of the controller may include any one or more of a microprocessor, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

Figure 6:
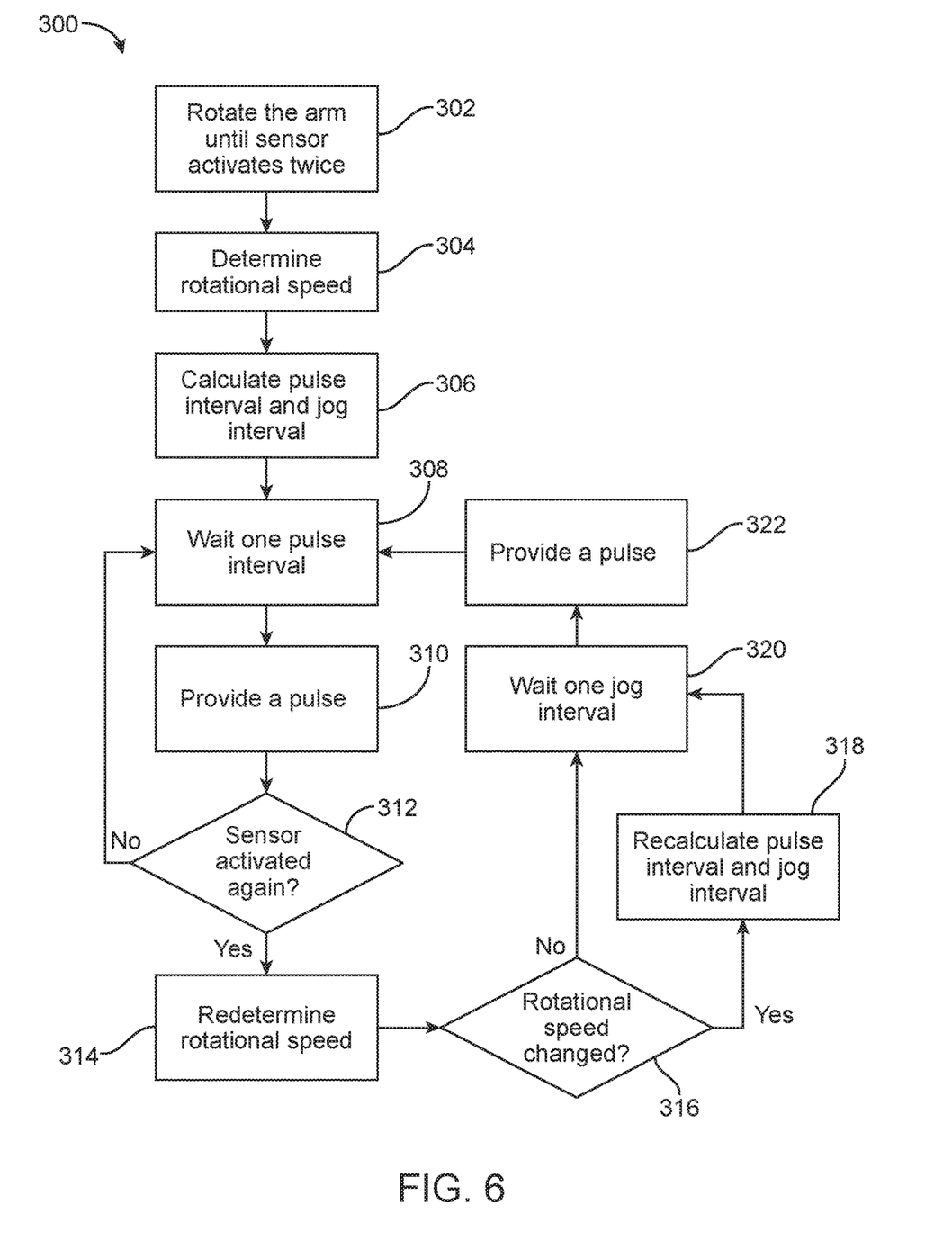
FIG. 6 is a flowchart of one example method of operating the pulse delivery cleaning system of FIG. 1.

FIG. 6 shows one example of a method 300 for operating a pulse delivery cleaning system, such as pulse delivery cleaning system 120, using a predetermined pattern of pulses. The method 300 may include rotating the arm until the position sensor assembly, or position sensor, activates twice in process 302. In general, the arm may be rotated more than 360 degrees but less than 720 degrees. A timer may be used to determine the time between activations of the position sensor. The method 300 may include determining a rotational speed of the arm in process 304, for example, based on the time between activations of the position sensor. In this case, the jog interval may be calculated as three-fourths of the pulse interval or 7.5 seconds.

The method 300 may include calculating a pulse interval and a jog interval based on the rotational speed in process 306. For example, the pulse interval may be determined based on a desired full clean time, the number of spokes in the tube sheet, and the rotational speed of the arm. For example, if the full clean time is four minutes and the tube sheet has twenty-four spokes, then six spokes need to be cleaned every minute to provide a full clean cycle within the full clean time. If the arm rotates at 1 RPM, then six spokes need to be cleaned per revolution at one pulse every 10 seconds, and the full clean cycle corresponds to four revolutions of the arm. The pulse interval may be calculated as 10 seconds, which should correspond to arm rotation past four spokes. The jog interval may be determined based on a desired shift in spokes, the pulse interval, and the number of spokes in the tube sheet. Using the same example, a desired shift in spokes may advance subsequent pulses by one spoke. Knowing that the pulse interval corresponds to arm rotation past four spokes, the jog interval should correspond to arm rotation past three spokes.

The method 300 may include waiting one pulse interval in process 308 and then providing a pulse in process 310 after the pulse interval expires. The method 300 may determine whether the position sensor has been activated again in process 312. If the position sensor has not been activated again, the method 300 may return to continue waiting one pulse interval in process 308 and providing a pulse in process 310.

Once the position sensor has been activated, the method 300 may redetermine the rotational speed of the arm in process 314. The method 300 may also determine whether the rotational speed of the arm has changed in process 316. Small changes in rotational speed can occur, for example, due to gear wear, small changes to alternating current (AC) frequencies, and changes that affect power to the motor. In response to the rotational speed being unchanged, the method 300 may wait one jog interval in process 320 and provide a pulse in process 322. In response to the rotational speed being changed, the method 300 may include recalculating the pulse interval and the jog interval in process 318. Using the example above, even a one-percent error, or change, from a preset rotational speed of 1 RPM to an actual rotational speed of 1.01 RPM may cause the pulse delivery system to miss a spoke, especially in systems with a large number of spokes. Recalculating the pulse interval and the jog interval based on the rotational speed, for example, in process 318, may prevent such misses.

The method 300 may then continue to wait one jog interval in process 320 and provide a pulse in process 322. In other embodiments, the method 300 may not need to decide whether the rotational speed of the arm has changed in process 316 and may instead recalculate the pulse interval and the jog interval in process 318 once every revolution in response to an activation, or triggering, of the position sensor.

After providing the pulse in process 322, the method 300 may return to waiting one pulse interval in process 308 and providing a pulse in process 310. The method 300 may continue to loop in this manner until the motor is turned off.

ILLUSTRATIVE EMBODIMENTS

While the present disclosure is not so limited, an appreciation of various aspects of the disclosure will be gained through a discussion of the specific illustrative embodiments provided below. Various modifications of the illustrative embodiments, as well as additional embodiments of the disclosure, will become apparent herein.

In illustrative embodiment A1, a system includes a stationary assembly having a tube sheet defining a plurality of holes in fluid communication with a plurality of filter bags and further having one or more actuators each configured to release pressurized air in response to a pulse command. The system also includes a rotating assembly having an arm defining one or more outlets positioned along a length of the arm. The one or more outlets are configured to provide pressurized air from an air source toward the tube sheet in response to the one or more actuators receiving a pulse command. The system also includes a motor operably coupled to the stationary assembly and the rotating assembly configured to rotate the arm about an axis at a preset rotational speed. The system also includes a controller operably coupled to the motor and the one or more actuators. The controller includes a processor configured to: provide a set of pulse commands to the one or more actuators to provide a set of pulses over one or more revolutions of the arm, determine a jog interval between the set of pulse commands and a subsequent set of pulse commands based on a measured rotational speed of the arm, and provide, after waiting one jog interval, the subsequent set of pulse commands to the one or more actuators to provide a subsequent set of pulses over one or more subsequent revolutions of the arm.

In illustrative embodiment A2, a system includes a system according to any A embodiment, wherein the processor is further configured to provide each of the commands when at least one of the one or more outlets is centered over a corresponding hole of the plurality of holes in the tube sheet.

In illustrative embodiment A3, a system includes a system according to any A embodiment, wherein the processor is further configured to determine the measured rotational speed of the arm after each of a first predetermined number of one or more revolutions of the arm.

In illustrative embodiment A4, a system includes a system according to any A embodiment, wherein the processor is further configured to wait one jog interval after each of a second predetermined number of one or more revolutions of the arm.

In illustrative embodiment A5, a system includes a system according to embodiment A3 or A4, wherein the first or second predetermined number of one or more revolutions is one revolution.

In illustrative embodiment A6, a system includes a system according to any A embodiment, further including a position sensor assembly coupled to the stationary assembly to provide measurements related to rotation of the arm.

In illustrative embodiment A7, a system includes a system according to embodiment A6, wherein a first part of the position sensor assembly is coupled to the stationary assembly and a second part of the position sensor assembly is coupled to the rotating assembly.

In illustrative embodiment A8, a system includes a system according to any A embodiment, wherein the processor is further configured to provide the subsequent set of pulse commands spaced by a pulse interval between the pulse commands.

In illustrative embodiment A9, a system includes a system according to embodiment A8, wherein the jog interval is shorter than the pulse interval.

In illustrative embodiment A10, a system includes a system according to embodiment A8 or A9, wherein the plurality of holes of the tube sheet are arranged into radial spokes and the pulse interval corresponds to rotation of the arm past a predetermined number of radial spokes.

In illustrative embodiment A11, a system includes a system according to embodiment A10, wherein the jog interval is configured to provide a subsequent pulse command one spoke earlier than the pulse interval.

In illustrative embodiment A12, a system includes a system according to embodiment A10 or A11, wherein the predetermined number of radial spokes is greater than one spoke.

In illustrative embodiment A13, a system includes a system according to any of embodiments A10-A12, wherein a total number of radial spokes is an integer multiple of the predetermined number of radial spokes passed during the pulse interval.

In illustrative embodiment A14, a system includes a system according to any A embodiment, wherein the plurality of holes in the tube sheet are arranged into concentric rings. The arm has a first segment defining a first set of the one or more outlets and a second segment defining a second set of the one or more outlets. The first set of the outlets are aligned to different concentric rings than the second set of the outlets.

In illustrative embodiment A15, a system includes a system according to embodiment A14, wherein one of the concentric rings has fewer of the plurality of holes in the tube sheet than another one of the concentric rings further from the axis.

In illustrative embodiment B1, an apparatus includes an input interface, an output interface, a memory, and a processor operably coupled to the input interface, the output interface, and the memory. The processor is configured to determine a rotational speed of an arm based on measurements from a position sensor assembly using the input interface. The arm defining one or more outlets are configured to release pressurized air in response to one or more actuators receiving a pulse command. The processor is also configured to determine a pulse interval and a jog interval based on the rotational speed of the arm. The pulse interval defines an interval between pulse commands in one set of pulse commands. The jog interval defines an interval between a set of pulse commands and a subsequent set of pulse commands. The processor is also configured to store the pulse interval and the jog interval into the memory. The processor is also configured to provide the subsequent set of pulse commands based on the pulse interval and the jog interval to the one or more actuators using the output interface to release the subsequent set of pulses of pressurized air through the one or more outlets.

In illustrative embodiment C1, a method includes revolving an arm about an axis. The arm defining one or more outlets positioned along a length of the arm. The one or more outlets are configured to direct pressurized air from an air source toward a tube sheet. The tube sheet defines a plurality of holes in fluid communication with a plurality of filter bags. The method also includes releasing a set of pulses of pressurized air from the one or more outlets over one or more revolutions of the arm. The method also includes determining a jog interval between the set of pulses and a subsequent set of pulses of pressurized air based on a measured rotational speed of the arm. The method also includes releasing, after waiting one jog interval, the subsequent set pulses from the one or more outlets over one or more subsequent revolutions of the arm.

In illustrative embodiment C2, a method includes a method according to any C embodiment, further including revolving the arm at least one revolution before determining the measured rotational speed of the arm.

In illustrative embodiment C3, a method includes a method according to any C embodiment, further including determining a pulse interval between pulses in the subsequent set of pulses based on user input indicating a tube sheet hole configuration and the measured rotational speed of the arm.

In illustrative embodiment C4, a method includes a method according to any C embodiment, wherein a full clean cycle of the plurality of filter bags corresponds to more than one revolution of the arm.

Thus, various embodiments of the PULSE DELIVERY CLEANING SYSTEMS AND METHODS are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

The singular forms "a," "an," and "the" encompass embodiments having plural referents unless its context clearly dictates otherwise.

The phrases "at least one of" "comprises at least one of," and "one or more of" followed by a list refers to any one of the items in the list and any combination of two or more items in the list.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like.

What is claimed is:

1. A system comprising:
    a stationary assembly comprising a tube sheet defining a plurality of holes in fluid communication with a plurality of filter bags and further comprising one or more actuators each configured to release pressurized air in response to a pulse command;
    a rotating assembly comprising an arm defining one or more outlets positioned along a length of the arm, the one or more outlets configured to provide pressurized air from an air source toward the tube sheet in response to the one or more actuators receiving a pulse command;
    a motor operably coupled to the stationary assembly and the rotating assembly configured to rotate the arm about an axis at a preset rotational speed; and
    a controller operably coupled to the motor and the one or more actuators, the controller comprising a processor configured to:
        provide a set of pulse commands to the one or more actuators to provide a set of pulses over one or more revolutions of the arm,
        determine a jog interval between the set of pulse commands and a subsequent set of pulse commands based on a measured rotational speed of the arm, and
        provide, after waiting one jog interval, the subsequent set of pulse commands to the one or more actuators to provide a subsequent set of pulses over one or more subsequent revolutions of the arm.

2. The system according to claim 1, wherein the processor is further configured to provide each of the commands when at least one of the one or more outlets is centered over a corresponding hole of the plurality of holes in the tube sheet.

3. The system according to claim 1, wherein the processor is further configured to determine the measured rotational speed of the arm after each of a first predetermined number of one or more revolutions of the arm.

4. The system according to claim 1, wherein the processor is further configured to wait one jog interval after each of a second predetermined number of one or more revolutions of the arm.

5. The system according to claim 4, wherein the first or second predetermined number of one or more revolutions is one revolution.

6. The system according to claim 1, further comprising a position sensor assembly coupled to the stationary assembly to provide measurements related to rotation of the arm.

7. The system according to claim 6, wherein a first part of the position sensor assembly is coupled to the stationary assembly and a second part of the position sensor assembly is coupled to the rotating assembly.

8. The system according to claim 1, wherein the processor is further configured to provide the subsequent set of pulse commands spaced by a pulse interval between the pulse commands.

9. The system according to claim 8, wherein the jog interval is shorter than the pulse interval.

10. The system according to claim 8, wherein the plurality of holes of the tube sheet are arranged into radial spokes and the pulse interval corresponds to rotation of the arm past a predetermined number of radial spokes.

11. The system according to claim 10, wherein the jog interval is configured to provide a subsequent pulse command one spoke earlier than the pulse interval.

12. The system according to claim 10, wherein the predetermined number of radial spokes is greater than one spoke.

13. The system according to claim 10, wherein a total number of radial spokes is an integer multiple of the predetermined number of radial spokes passed during the pulse interval.

14. The system according to claim 1, wherein the plurality of holes in the tube sheet are arranged into concentric rings, wherein the arm comprises a first segment defining a first set of the one or more outlets and a second segment defining a second set of the one or more outlets, wherein the first set of the outlets are aligned to different concentric rings than the second set of the outlets.

15. The system according to claim 14, wherein one of the concentric rings has fewer of the plurality of holes in the tube sheet than another one of the concentric rings further from the axis.

16. An apparatus comprising:
an input interface;
an output interface;
a memory; and
a processor operably coupled to the input interface, the output interface, and the memory,
the processor configured to:
determine a rotational speed of an arm based on measurements from a position sensor assembly using the input interface, the arm defining one or more outlets configured to release pressurized air in response to one or more actuators receiving a pulse command;
determine a pulse interval and a jog interval based on the rotational speed of the arm, the pulse interval defining an interval between pulse commands in one set of pulse commands, the jog interval defining an interval between a set of pulse commands and a subsequent set of pulse commands,
store the pulse interval and the jog interval into the memory, and
provide the subsequent set of pulse commands based on the pulse interval and the jog interval to the one or more actuators using the output interface to release the subsequent set of pulses of pressurized air through the one or more outlets.

17. A method comprising:
revolving an arm about an axis, the arm defining one or more outlets positioned along a length of the arm, the one or more outlets configured to direct pressurized air from an air source toward a tube sheet, the tube sheet defining a plurality of holes in fluid communication with a plurality of filter bags;
releasing a set of pulses of pressurized air from the one or more outlets over one or more revolutions of the arm;
determining a jog interval between the set of pulses and a subsequent set of pulses of pressurized air based on a measured rotational speed of the arm; and
releasing, after waiting one jog interval, the subsequent set pulses from the one or more outlets over one or more subsequent revolutions of the arm.

18. The method according to claim 17, further comprising revolving the arm at least one revolution before determining the measured rotational speed of the arm.

19. The method according to claim 17, further comprising determining a pulse interval between pulses in the subsequent set of pulses based on user input indicating a tube sheet hole configuration and the measured rotational speed of the arm.

20. The method according to claim 17, wherein a full clean cycle of the plurality of filter bags corresponds to more than one revolution of the arm.

* * * * *